United States Patent [19]
Fukuhara et al.

[11] Patent Number: 6,061,633
[45] Date of Patent: May 9, 2000

[54] BOREHOLE LOGGING SYSTEM

[75] Inventors: Masafumi Fukuhara, Sagamihara; Takeaki Nakayama, Machida, both of Japan

[73] Assignee: Schlumberger Technology Corporation, Sugar Land, Tex.

[21] Appl. No.: 09/117,344
[22] PCT Filed: Jan. 31, 1997
[86] PCT No.: PCT/IB97/00154
§ 371 Date: Apr. 12, 1999
§ 102(e) Date: Apr. 12, 1999
[87] PCT Pub. No.: WO97/28466
PCT Pub. Date: Aug. 7, 1997

[30]  Foreign Application Priority Data

Jan. 31, 1996 [JP] Japan .................................. 8-015710

[51] Int. Cl.⁷ .................................................. G01V 1/00
[52] U.S. Cl. ................................................. 702/6; 367/31
[58] Field of Search ........................... 702/6, 1; 367/33, 367/25, 31

[56]  References Cited

U.S. PATENT DOCUMENTS

| | | | |
|---|---|---|---|
| 3,521,154 | 7/1970 | Maricelli | 324/10 |
| 4,216,536 | 8/1980 | More | 367/83 |
| 4,718,011 | 1/1988 | Patterson, Jr. | 354/422 |
| 4,760,563 | 7/1988 | Beylkin | 367/73 |
| 4,881,207 | 11/1989 | Dubesset et al. | 367/31 |
| 5,583,835 | 12/1996 | Carrazzone et al. | 367/31 |
| 5,638,337 | 6/1997 | Priest | 367/27 |
| 5,678,643 | 10/1997 | Robbins et al. | 175/45 |
| 5,703,773 | 12/1997 | Tabarovsky et al. | 364/422 |
| 5,784,333 | 7/1998 | Tang et al. | 367/30 |
| 5,864,772 | 1/1999 | Alvarado et al. | 702/9 |

*Primary Examiner*—Christine K. Oda
*Assistant Examiner*—Victor J. Taylor
*Attorney, Agent, or Firm*—Martin Hyden; Steven L. Christian

[57] ABSTRACT

For various reasons it may be desirable to change the way a sonde is programmed to behave and respond to the data it receives and operates on, and at present each time this must be done it has been necessary to lift the sonde out of the borehole and then disassemble it to permit the removal of the old ROM and its replacement with a new ROM storing the new program. The operability and efficiency of such an arrangement is poor. To deal with this, the present invention proposes that the sonde also includes: signal processing means for processing a sampled detection signal according to a predetermined signal processing program; first memory means for storing that signal processing program; and second memory means storing a writing program for writing the signal processing program in the first memory means according to a command from the ground surface processing apparatus. In this way the sonde's program can be updated from the surface simply by downloading the new program into it, and without the need to bring the sonde up to the surface.

12 Claims, 7 Drawing Sheets

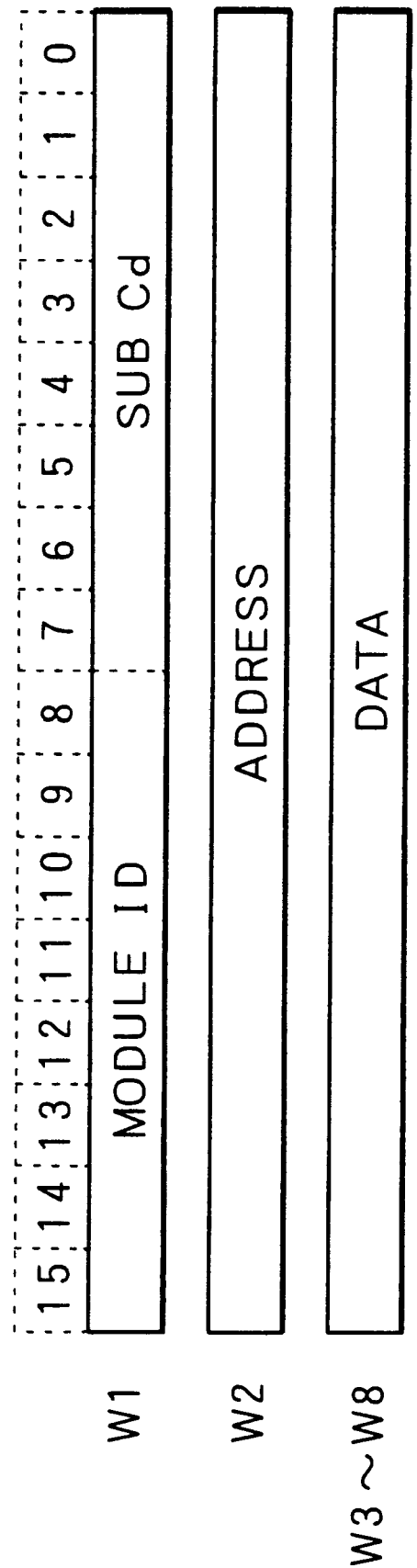

BOREHOLE LOGGING SYSTEM

DESCRIPTION OF THE INVENTION

1. Field of the Invention

The invention relates to a data logging system, and concerns in particular a logging system capable of efficiently rewriting a logging signal processing program stored in a logging sonde.

2. Background

In carrying out an exploration for underground resources, such as oil, it is necessary to determine the nature of the underground formations in which the oil is suspected to be. It has therefore been conventional to drill a borehole deep into the ground, locate a logging sonde (also referred to as a downhole tool) at an appropriate position down the borehole so as to detect a signal which has propagated through the relevant ground formation, and analyse the signal thus detected so as to estimate and evaluate the underground structure. Such an exploration technique is normally referred to as well logging, and a logging system for use therein typically includes a sonde (which is moved up and down inside a borehole, and which sealingly houses therein a detection unit and a data sampling circuit), ground surface processing apparatus (including a computer or the like located on the surface adjacent to the borehole), and a logging cable for both mechanical and electrical coupling between the sonde and the ground surface processing apparatus. An example of such a logging system is illustrated in FIG. 1 of the accompanying drawings.

As shown in FIG. 1, a logging sytem 1 is generally composed of ground surface processing apparatus 2 located on the ground surface 5, a sonde 3 movable up and down inside a borehole 8, and a logging cable 4 for mechanical and electrical coupling between the processing apparatus 2 and the sonde 3. The ground surface processing apparatus 2 includes a rotatable drum 6 to which one end of the logging cable 4 is connected. When the drum 6 rotates clockwise or counter-clockwise, the logging cable 4 is either supplied or taken up, so that the sonde 3 connected to the other end of logging cable 4 is moved up and down inside the borehole 8. The logging cable 4 is connected (for data transfer) to an exteension 4' of the logging cable at the rotating axis of drum 6, and the extension 4' is connected to a computer 11.

In the example shown in FIG. 1, a casing 9 is inserted into the borehole 8 to prevent the formation from collapsing into the borehole 8. However, the borehole 8 may be a bare borehole without the caseing 9.

The sonde 3 is provided in this embodiment with a detection electrode 12 for sampling a signal which has propagated through the formation. The detection electrode 12 is connected through an internal interconnection 14 to a control unit 13, which is sealingly housed inside the sonde 3. The control unit 13 is in charge of the control of the overall operation of the sonde, and, in particular, is in charge of the control of data sampling, processing and transmission as well as of diagnosing the various functions of the sonde in accordance with commands from the computer 11 on the surface. The control unit 13 includes a microprocessor and a ROM storing a control program so as to interpret commands transmitted from the computer 11 at ground surface and carry out an operation in accordance with such commands.

Each time the functions of the sonde 3 are to be changed or improved the program presently stored in the ROM within the control unit 13 cannot be used any more, and must therefore be changed. Hitherto, with such a change in functions it has been necessary to lift the sonde out of the borehole—up to the surface—and then to partly disassemble the sonde to remove the old ROM therein and replace it with a new ROM storing the new program. A ROM writer is required in order to store the new program in the new ROM, and the old ROM must then be disposed of. Not only is this throwing-away of the old ROM rather wasteful, but, because it is always necessary to have the sonde pulled up to the surface for replacement of the Roms, the operability and efficiency of the system is poor.

SUMMARY OF THE INVENTION

In accordance with the present invention, there is provided a borehole logging system including a processing apparatus to be located at the ground surface, a sonde upwardly and downwardly movable within the borehole/ and a logging cable for connection between the processing apparatus and the sonde, and from which the sonde may be suspended in the borehole, which system is characterised in that the sonde also includes:

signal processing means for processing a sampled detection signal according to a predetermined signal processing program;

first memory means for storing that signal processing program; and second memory means storing a writing program for writing the signal processing program in the first memory means according to a command from the ground surface processing apparatus.

In a preferred embodiment, the two memory means are non-volatile, and, in a particularly preferred embodiment, the first memory means is at least a portion of an EEPROM. The second memory means is also preferably defined by another portion of the same EEPROM, but since this second memory means is for storing a program for writing a new signal processing program into the first memory means when the signal processing program stored in the first memory means has been updated, and since the programming program is rarely altered, the second memory means may be a ROM (which is not re-writable) rather than an EEPROM.

It will be apparent that, because—in the invention—the sonde's data processing program is re-writable, the logging system operator on the surface can change the processing program in the relative comfort of the surface environment. Moreover, and most conveniently, the the program can be stored on a floppy disk or any other medium, for example, and then installed on the hard disk of the ground surface processing apparatus's computer. Commands can then be transmitted from that computer to the sonde through the logging cable to activate the writing program inside the sonde, and then the new control program can be transmitted to the sonde and stored in its memory. And preferably, each time the transmission of command data has been carried out, the same command is echoed back to confirm the reliability of the original data transmission.

In the case where an EEPROM is used as memory in the sonde, and since the sonde is typically subjected to severe downhole environmental conditions, including high pressures and high temperatures, it is desirable to record the number of time the program has been re-written, and then to replace the EEPROM with a new one when that number exceeds a predetermined value—and thus to ensure the reliability of the re-programming of the EEPROM.

An embodiment of the invention is now described, though by way of illustration only, with reference to the accompanying Drawings.

BRIEF DESCRIPTION OF THE DRAWINGS

FIG. 7 Schematic illustration showing an example of OBP or command which can be used in the embodiment of on-board programming of FIGS. 3–6.

Explanation of Numerals

1: Logging System
2: Ground Surface Processing Apparatus
3: Sonde
4, 4': Logging Cable
8: Borehole
11: Computer
13: Control Unit
15, 16: Telemetry Interface
20: Non-volatile Programmable Memory
28a: Telemetry Buffer
26: Digital Signal Processor (DSP)
30: Data Memory
30a: rbuf
30b: sendbuffer
31: TOR Memory

MODES OF EMBODYING THE INVENTION

Figure 1:
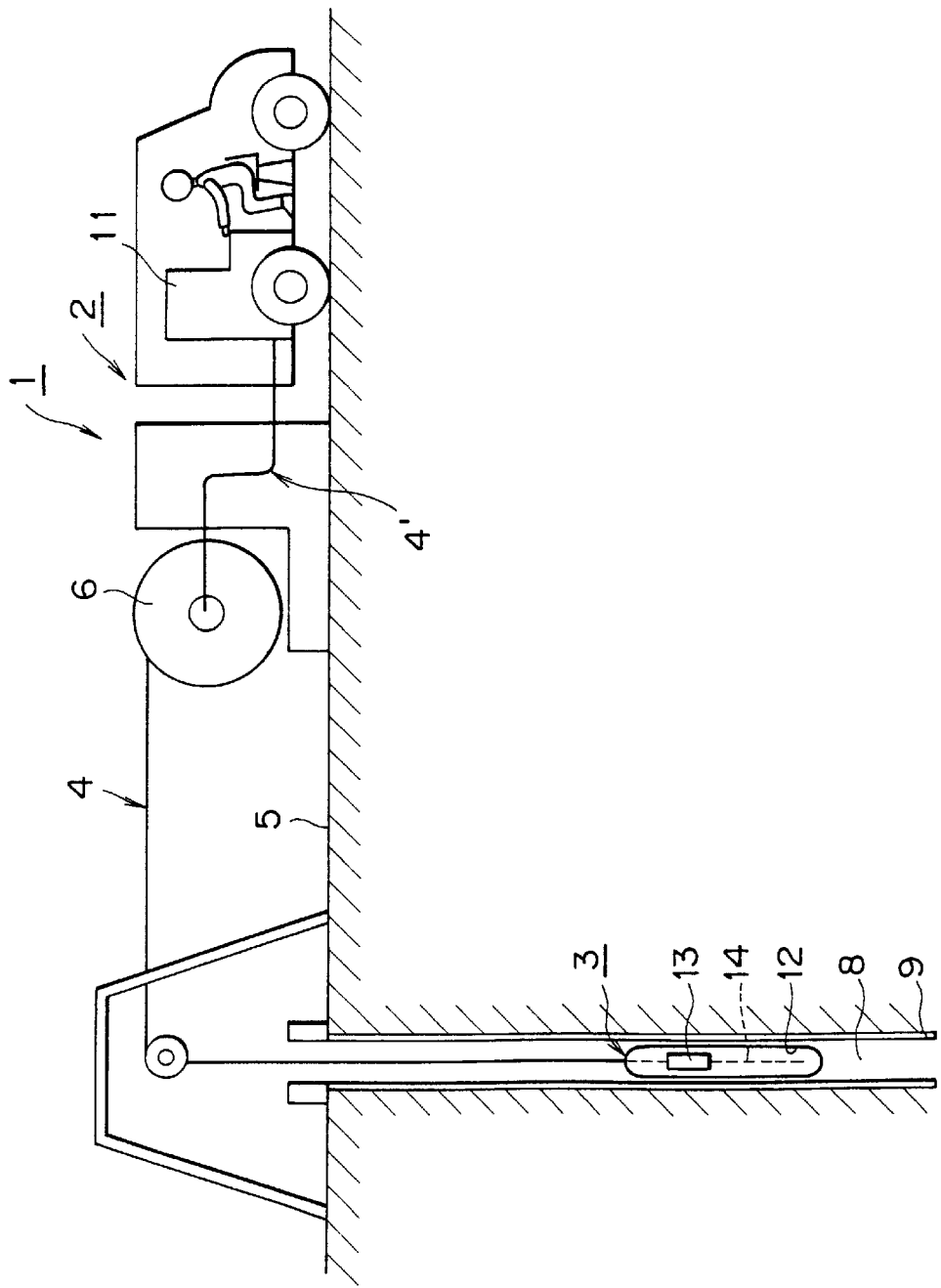
FIG. 1 Schematic illustration showing the overall structure or a logging system to which the present invention can be applied.

FIG. 1 has already been described hereinbefore.

Figure 2:
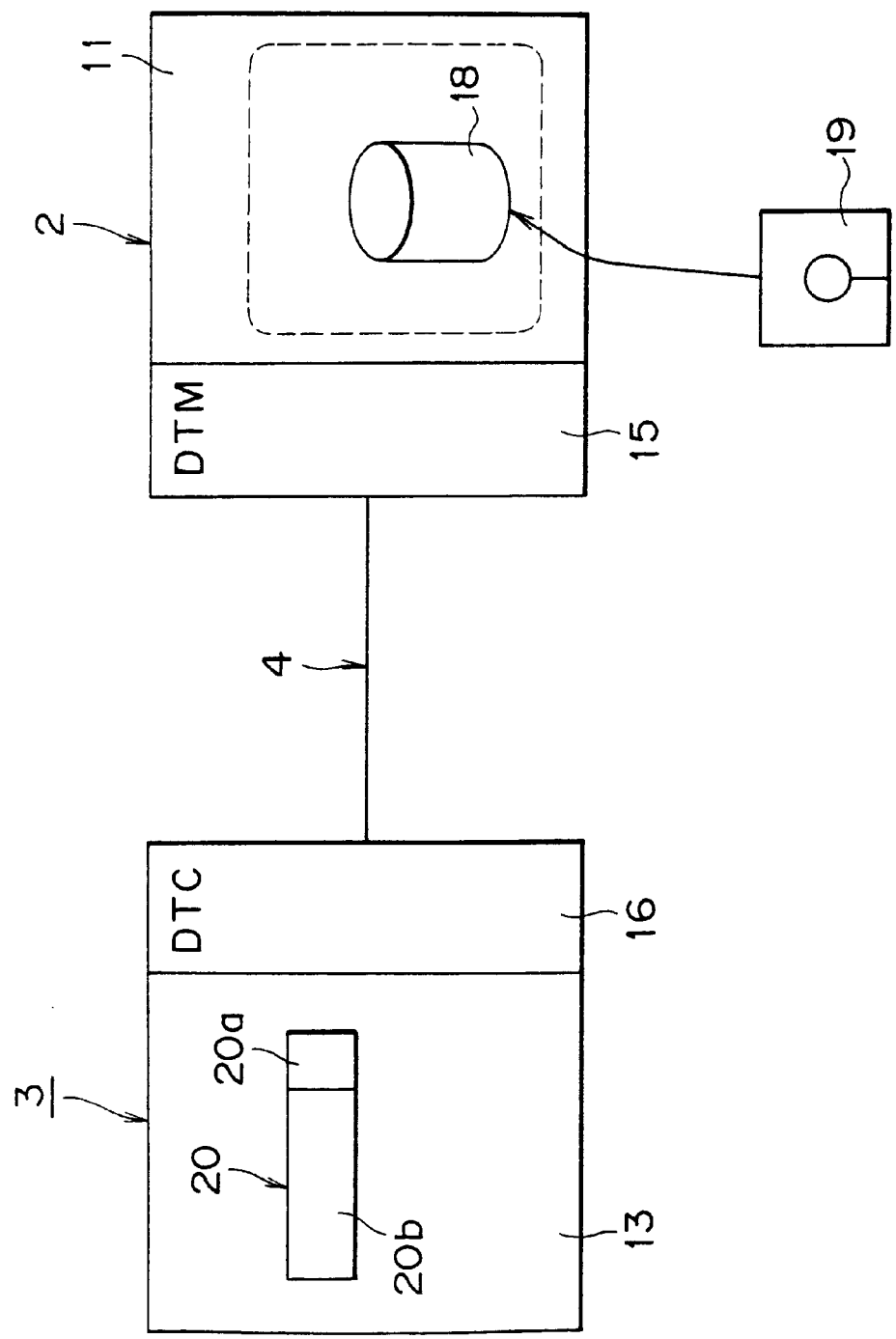
FIG. 2 Schematic block diagram showing the principle or the present invention.

FIG. 2 is a schematic illustration showing the basic principle of the present invention. That is, in FIG. 2, the ground surface processing apparatus 2 (11) including a computer is mechanically and electrically connected to the sonde 3, which can be moved up and down inside a borehole, through the logging cable 4. Since the logging cable 4 can move the sonde 3 up and down inside the borehole 8 in a suspended condition, the logging cable 4 defines a mechanical coupling between the sonde 3 and the ground surface processing apparatus 2. Besides, the logging cable 4 can carry signals for communication between the control unit 13 for data sampling and diagnosis provided in the sonde 3 and the computer 11 of ground surface processing apparatus 2 and thus includes transmission lines therefor. Incidentally, as the transmission lines, use may be made of metal wires as well as optical fibers. Thus, in this specification, the expression of the logging cable 4 serving as an electrical coupling between the ground surface processing apparatus 2 and the sonde 3 includes the case in which the logging cable 4 has optical fibers in place of or in addition to metal wires for communication, namely the case in which, the ground surface processing apparatus 2 and the sonde 3 are optically coupled.

The logging cable 4 is operatively coupled at the side of ground surface processing apparatus 2 to the computer 11 through a DTM interface 16 and at the side of sonde 3 to the control unit inside the sonde 3 through a DTC interface 16. The logging cable 4, together with DTM and DTC interfaces 15 and 16 at its opposite ends, define a telemetry system which allows to carry out data transmission between the ground surface processing apparatus 2 and the sonde 3. The computer 11 of ground surface processing apparatus 2 can be any general purpose computer and use may, for example, be made of a VAX computer. The computer 11 includes a hard disc 18 which stores thereon an operating system OS, and various control programs for the sonde 3, which runs on the operating system OS, can be stored on the hard disc 18. Incidentally, operating system OS can include extended functions, such as communication function, memory management function or the like, rather than a simple operating system. Inside the control unit 13 of sonde 3 is provided a non-volatile programmable memory 20, which can store a program for implementing various functions of sonde 3. Although the sonde 3 can take various modes depending on various objectives, it has fundamentally a basic data processing function of detecting a signal which has propagated through the formation, processing the signal thus detected and transmitting the signal thus processed to the ground surface processing apparatus 2. Such a data processing function is often modified because of finding of bugs in the program or improvements in performance. Even if the program has been modified in, this manner, in the present logging system, since the memory 20 for storing a data processing program is a non-volatile programmable memory, the program stored on the hard disc 18 of computer 11 of ground surface processing apparatus 2 can be transmitted through the logging cable 4 to be written into the memory 20.

As described above, the memory 20 is non-volatile and programmable. Preferably, use is made of an electrically erasable programmable read only memory or EEPROM or any other similar memory. In the structure shown in FIG. 2, the memory 20 is divided into a first memory region 20a and a second memory region 20b. The first memory region 20a is a region for storing a writing program to carry out the so-called on-board programming (OBP) for storing a data processing program, which has been received by analyzing the commands from the computer 11, at predetermined addresses within the second memory region 20b in the case when a newly developed data processing program is to be transmitted from the computer 11 at ground surface to the sonde 3 to be stored therein. In FIG. 2, although there is shown a structure in which the program or on-board programming and the program for processing data are stored in separate regions of the same memory, the program for on-board programming does not have to be stored in a programmable memory by all means. This is because, since the program for on-board programming is normally less likely to be modified, it can be stored in a memory separate from the memory which stores the program for processing data and such a memory can be a non-programmable ROM. When so constructed, although there are disadvantages of incapability to modify the program for on-board programming and the necessity to provide a separate ROM, since the program for on-board programming is stored in a memory separate from the memory for storing the program for processing data, which is most likely to be modified, there is an advantage in that processing is simplified in writing the program for processing data into memory 20.

Now, with reference to FIG. 2, a method for updating the program for processing data inside the sonde 3 will be described. It is hereby assumed that the program for on-board programming has already been stored in the first memory region 20a of memory 20 within the sonde 3. It is also assumed here that since it was desired to add a new function to the sonde 3 in the case of carrying out some logging with the sonde 3 located inside the borehole 8, there has been developed an update version which is an improvement over the program for processing data stored in the second memory region 20b of memory 20. The development of such a new data processing program can be carried out at any desired location where the developer wishes and thus it can be done in an environment most suitable for such development. The data processing program thus developed is then stored on an arbitrary recording medium, such as a floppy disc 19, and shipped to a position where the ground surface processing apparatus 2 is located. Since the ground surface processing apparatus 2 is coupled to the sonde 3 via the logging cable 4, it is typically located in the neighborhood at the mouth of borehole 8.

Then, the operator at the ground surface processing apparatus 2 inserts the floppy disc 19 into the computer 11 and have the operating system OS started to transfer the updated data processing program stored on the floppy disc 19 to the hard disc 18. Then, the telemetry system is activated, and based on commands from the computer 11, the data processing program is transferred from the hard disc 18 to the second memory region 20b of memory 20 inside the sonde 3. In this case, preferably, in order to secure the reliability of data transmission, each time when each command from the commuter 11 has been interpreted and processed by a microprocessor (not shown) within the control unit 13 of sonde 3 so that data has been stored at predetermined addresses in the second memory region 20b, the same command is echoed back to the computer 1, and if the echoed back signal is identical to the original command, the next command is transmitted. In the present Invention, as shown in FIG. 1, such on-board programming can be carried out with the sonde 3 located at a lowered position inside the borehole 8; however, in the present invention, it is not by all means necessary to have the sonde 3 located inside the borehole 8. That is, even if the sonde 3 is located on the ground surface, as long as the sonde 3 is coupled to the ground surface processing apparatus 2 through the logging cable 4, the above-described on-board programming can be carried out, and, even in this case, the present invention can produce significant effects since the ROM is not wasted and there is no need to carry out a complicated operation for replacing memories (including partial disassembly of sonde 3).

Figure 3:
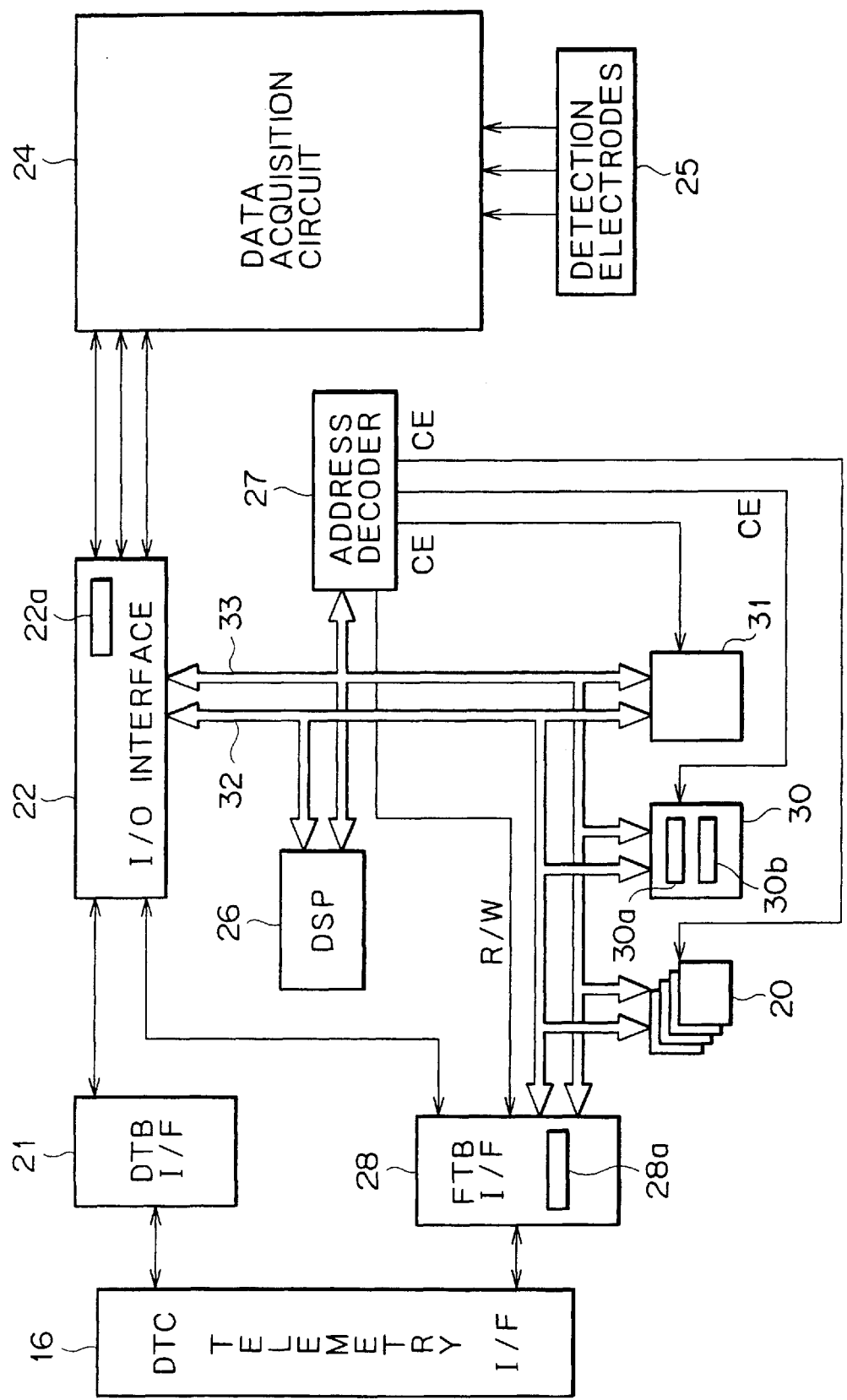
FIG. 3 Schematic block diagram snowing a control unit of a sonde capable of implementing on-board programming constructed in accordance with one embodiment of the present invention.

Now, referring to FIG. 3, a specific embodiment or the control unit 13 of sonde 3 will be described in detail. In FIG. 3, DTC 16 is a telemetry interface at the side of sonde 3 and as shown in FIG. 1 it is connected to the logging cable 4. This telemetry interface 16 is connected to a pair of bus control interfaces, i.e., DTB (downhole tool bus) interface 21 and FTB (fast transmission bus) interface 28. Although these paired bus interfaces 21 and 28 are basically same in structure, the FTB interface 28 is structured to be larger in capacity and suitable for high speed processing. A telemetry buffer 28a is provided in the FTB interface 28 as a temporary storing region. The telemetry buffer 28a may be constructed by hardware, such as a register, or by assigning a partial region of a RAM memory or the like using software.

Bus interfaces 21 and 28 are both connected to I/O interface 22 which has IO_MCR resister 22a as a control register. The control register 22a is used for carrying out page control of boot memory 20 in cooperation with write access enable control and an address decoder as will be described later.

Bus interface 28 and I/O interface 22 are connected through a pair of data bus 32 and address bus 33, which are also connected to digital signal processor 20, boot memory 20, data memory 30 and TOR memory 31. In addition, address bus 33 is also connected to address decoder 27. The digital signal processor 26 may be comprised of ADSP-2101 DSP commercially available from Analog Devices Inc. of the U.S.A. A read/write signal R/W is applied to the bus interface 28 From the address decoder 27, and a chip enable signal CE is applied to memories 20, 30 and 31 to check their operating conditions.

The boot memory 20, in this embodiment, is comprised of an EEPROM, whose entire memory region is divided into eight pages, i.e., page 0 through page 7. It is to be noted that only four pages among the eight are shown in FIG. 3. In the present invention, it is not particularly necessary to divide the boot memory 20 into eight pages, and it can be set at any other desired number of pages. In this embodiment, the program for on-board programming is stored on page 0 and any other logging program, such as a data processing program, is stored on pages 1 through 7. Since the OBJ program stored on page 0 is a control program for controlling the storage of a logging program on pages 1 through 7, it is, in principle, not expected to be modified. Thus, in the case where on-board programming is to be carried out, it is necessary to take preventive measures so that writing of the OBJ program is not carried out on page 0. As a modification of the present embodiment, since the OBJ program stored on page 0 is essentially not expected to be modified, it can be stored on a separate ROM connected to data bus 32 and address bus 33. In this case, a logging program can be stored from page 0 of boot memory 20, which facilitates the write control of the on-board programming.

The data memory 30 may, for example, be comprised of a RAM and it is used to store data temporarily. In the data memory 30 are defined a read buffer (rbuf) 30a for reading and temporarily storing the data transmitted from the commuter 11 at ground surface and a transmission buffer (sendbuffer) 30b for transmitting and temporarily storing the data to be transmitted to the computer 11 at ground surface. The buffers 30a and 30b may be defined by securing desired regions of a RAM which constitutes the data memory 30.

The TOR memory 31 is a tool operation recorder (TOR) memory which records the use environment and operating information, such a s operating temperature and operating time, of sonde 3. The TOR memory 31 may be composed of a RAM, EPROM or EEPROM. In particular, in the present invention, the TOR memory 31 has a structure to record the number of times of OBP which has been carried out to boot memory 20.

The digital signal processor 26 processes the commands stored in the data memory 30 in association with the address decoder 27. In this case, the digital signal processor 26 causes the logging program transmitted from the computer at the ground surface to be stored on pages 1 through 7 of boor memory 20 in accordance with the OBP program stored on page 0 of boot memory 20. If desired, in an alternative embodiment, the digital signal processor 26 may be replaced by a microprocessor, microcontroller or the like.

The I/O interface 22 is connected to 2 data sampling circuit 24 which, in turn, is connected to a detection electrode 25. In the present invention, although it is not by all means necessary to have the data sampling circuit 24, since, as a normal function of sonde 3, there exists a data sampling function for detecting a signal which has propagated through the underground formation with the detection electrode 25 provided on sonde 3 and obtaining such a detection signal as a data, the data sampling circuit 24 is to represent such a typical unction of sonde 3. Such a data sampling function constitutes part of a logging program so that the operation data sampling circuit 24 is controlled in accordance with the logging program stored on pages 1 through 7 of boot memory 20. When the logging program for controlling such a data sampling operation has been updated, the logging program thus updated is transmitted from the computer 11 at ground surface and stored onto pages 1 through 7 of boot memory 20 in accordance with the OBP program stored on page 0 of boot memory 20.

Figure 4:
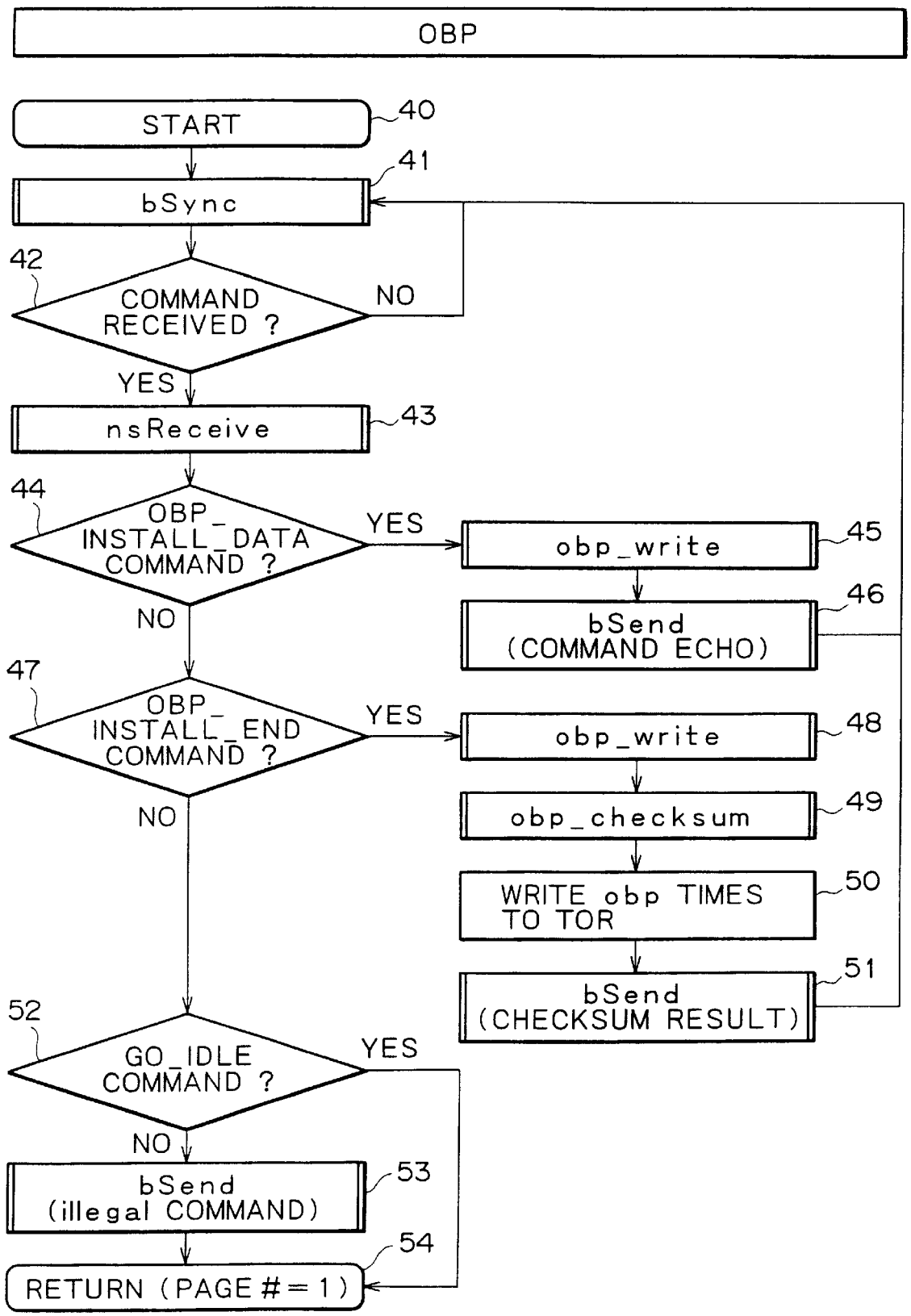
FIG. 4 Flow chart showing the main routine of on-board programming based on one embodiment of the present invention.

Then, with reference to FIG. 4, the operation of one embodiment of OBP program stored on page 0 of boot memory 20 will be described in detail. In the embodiment shown in FIG. 4, the OBP program fundamentally includes a main routine and five sub-routines (i.e., bSync, nsReceive, obp_write, bSend, and obp_checksum). FIG. 4 illustrates a flow chart of the main routine.

The updated logging program has been installed in the commuter 11 of ground surface processing apparatus 2 and a preparation has been done to transmit the undated logging program to the sonde 3 through the logging cable 4. Then, as shown in FIG. 4, when the sonde 3 has received a telemetry sync signal produced by the telemetry interface 16 at a predetermined time interval, the process beginning with step 21 is started as shown by step 40. At step 41, sync sub-routine bSync stored on page 0 of boot memory 20 is called to thereby establish a synchronized condition with the telemetry system and checks periodically in a polling mode to determine whether or not a command has been received at the telemetry buffer 28a within the bus interface 28 from the computer 11. At step 42, if it has been determined that a command from the computer 11 exists in the telemetry buffer 28a, the main routine at step 43 calls reception sub-routine nsReceive to thereby cause the command within the telemetry buffer 28a to be transferred to rbuf 30a within the data memory 30. Then, at step 44, DSP 26 interprets the command in rbuf 30a to thereby determine whether or not it is a command OBP_INSTALL_DATA for installing the updated on-board programming data into the boot memory 20.

If the result of determination at step 44 is affirmative, then it proceeds to step 45 to call writing sub-routine obp_write, which constitutes the main body of the program for on-board programming. As a result, writing of the command data into the boot memory 20 is carried out according to sub-routine obp_write, which will be described more in detail later with reference to FIG. 5. Upon completion of writing of the command, sub-routine bSend, which transmits data to the computer 11, is called at step 46, so that the same command as that which has been processed at step 45 is returned to the computer 11 through the logging cable 4 as an echo-back. Thus, at the computer 11, the echoed back command is compared with the command which has previously been transmitted to the sonde 3, and if the result of comparison indicates the equality, then it is interpreted that the transmission has been successful, whereas, If the result of comparison indicates inequality, then the computer 11 aborts the process.

If the echoed back command has been checked to be OK by the computer 11, then the computer 11 transmits the next command to the sonde 3. And, then, steps 40 through 44 of the main routine shown in FIG. 4 are similarly repeated also for this command. And, If It has been determined that the command is the Last command of OBP programming, i.e., OBP_INSTALL_END command, at step 47, then it proceeds to step 48. At step 48, sub-routine obp_write is again called to carry out the writing of the last OBP program data into the boot memory 20. Then, at step 49, a sub-routine obp_checksum, which checks the written condition of the OBP program written In the boot memory 20, is called, thereby checking whether or not there is any error in the OBP program thus written. Then, it proceeds to step 50, where the number of times writing has been carried out, which indicates how many times OBP program has been written into the memory 20, is stored into the TOP memory 31. This is because, in the case where the boot memory 20 is comprised of an EEPROM, since the reliability in writing decreases if the number of write times has exceeded a predetermined value, a signal may be sent to the computer 11 to produce warning. Then, it proceeds to step 51 where an echo back is sent to computer 11, together with the checksum result.

Then, if it is determined at step 52 that the command sent from the computer 11 is GO_IDLE, which indicates to get out of the OBP programming mode, the OBP mode is terminated and then it proceeds to step 54, where the DSP 26 carries out a reboot operation to have the logging program stored on page 1 et. seq. of boot memory 20 started. As a result, the updated logging program stored on pages 1 through 7 of boot memory 20 is rendered operative. On the other hand, if it has been determined as a result of determination at step 52 that it is not GO_IDLE command, then since is a command which is not expected in the main routine of FIG. 4, it is echoed back to the computer 11 as an illegal command at step 53.

Now, with reference to FIG. 5, the process of writing sub-routine obp_write of on-board programming OBP will be described in detail below. Prior thereto, the OBP command used in FIGS. 4 and 5 will be explained with reference to FIG. 7. The OBP command has a frame which includes eight fixed length words, in which the first two words W1 and W2 define a header and the remaining six words W3 through W8 define data. In FIG. 7, what is indicated by the dotted lines above first word W1 are bit locations of each word by way of bit numbers. In the example of FIG. 7, the upper eight bits of word W1 define a region for storing module ID information, and, thus, the ID information for identifying the sonde 3 is stored therein. On the other hand, the lower eight bits are assigned to OBP sub-commands and they indicate any of these various commands depending on the bit assignment. For example, in the case of bit assignment of "0x86" in the hexadecimal number, its command may be OBP_INSTALL_DATA, and for the bit assignment of "0x84", its command may be OBP_INSTALL_END. In addition, bit 0 word W1 is used as a continuation Flag (Cf), so that if this bit is set at "1", then it indicates that the command is continuous with the immediately preceding command.

The second word W2 within the command contains address information regarding the location to store the data which follows. And, third through eighth words W3–W8 store the data to be stored in the boot memory 20, e.g., the updated logging program in the present embodiment. Thus, a single command includes the total of six data words W3 through W8. Since each word includes two bytes (1 byte=8 bits), each command includes twelve bytes of data in total. Incidentally, in the hexadecimal notation, the bits which can be assigned to each of words W2 through W8 range between "0x0" and "0xFFFF."

Figure 5:
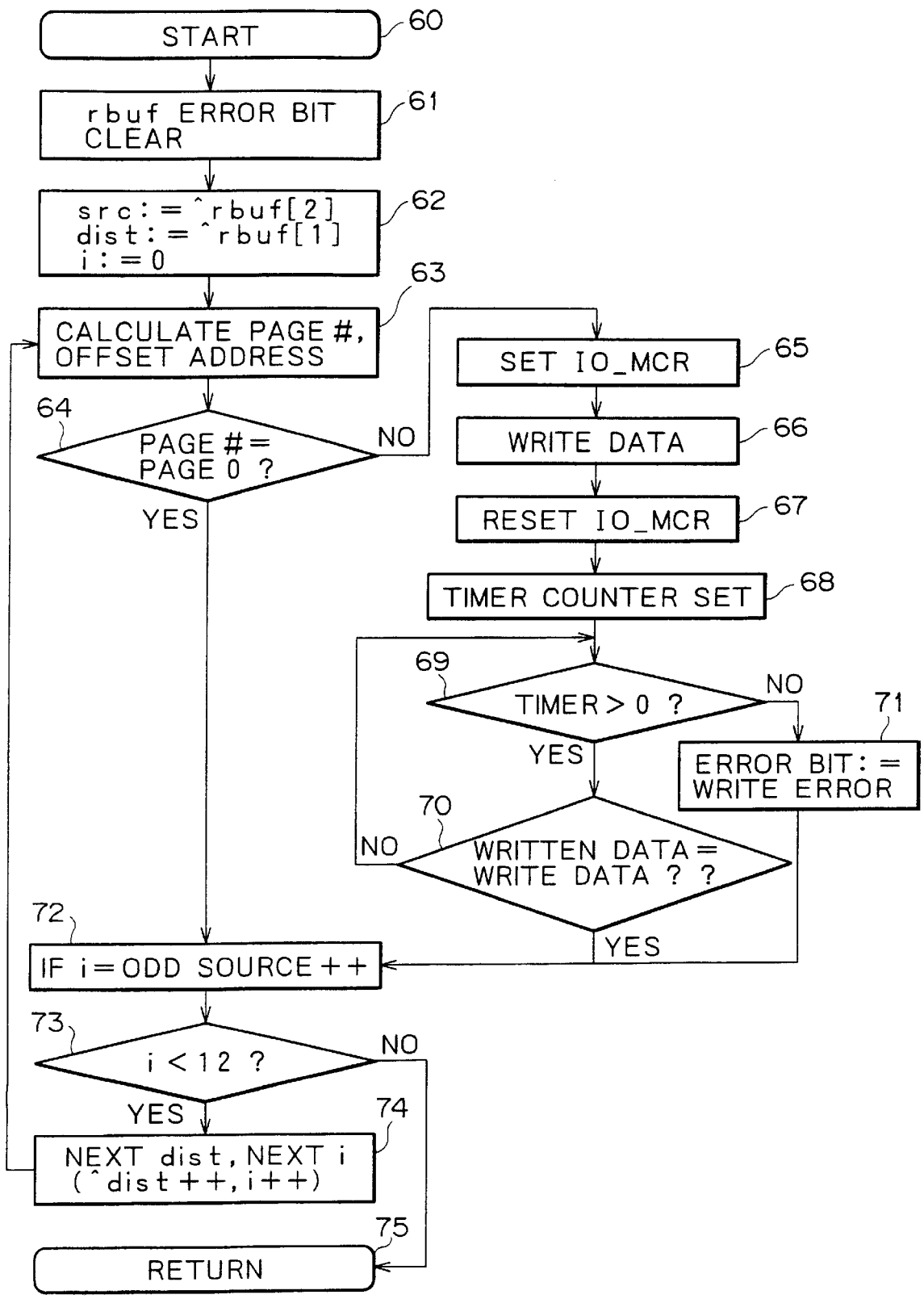
FIG. 5 Flow chart showing a write sub-routine of the on-board programming which is called by the main routine of FIG. 4.

In the main routine illustrated in FIG. 4, if it has been determined that an OBP program should be written into the boot memory 20, the writing program obp_write illustrated in FIG. 5 is called at step 60. Then, at steps 61 and 62, initialization is carried out as a preparation for writing the OBP program into the boot memory 20. That is, in the First place, at step 61, the error bits within the read buffer rbuf 30a are cleared, and, then, at step 62, while setting the address within rbuf 30a, which is a source of supplying data to be written, as "src", the address within the boot memory 20, into which the data is to be written, is set as "dist" and then the counter is set to be 0.

Then, at step 63, the corresponding page number of boot memory 20 is calculated from address "dist" and the offset address within the corresponding page is calculated. In addition, one byte of data is extracted from the data portion of the command within rbuf 30a. Then, at step 64, it is determined whether the page number thus calculated is "0" or not, and, if the result of determination is affirmative, then it jumps to step 72 to bypass the OBP write sequence. This is because, in the present embodiment, since the OBP program, which controls on-board programming, itself is stored on page 0 of boot memory 20, the jumping to step 72 takes place to avoid the OBP program from being overwritten. On the other hand, if the result of determination at step 64 indicates the fact that the calculated page number is other than page 0, then it proceeds to step 65, where the IO_MCR regsiter is set to establish a write enable condition and ore byte of extracted data is written into the boot memory 20 at its corresponding address. Then, at step 67, the IO_MCR register is reset to release the write enable condition. Then, at step 68, the timer counter is set, and, at step 69, it is determined whether a predetermined timer period has elapsed or not, and, furthermore, at step 70, it is determined whether the data to be written into the address and the data which has been written are identical or not, i.e., whether the data has been correctly written or not. If the result of determination at step 70 is negative, then it goes back to step 69, and, moreover, if the timer period has already elapsed, then it proceeds to step 71. In this case, since writing has not been done properly with a predetermined time period, an error bit is set On the other hand, if the result of determination at step 70 is affirmative, then it indicates the fact that writing has been completed properly.

In this manner, the fact that a predetermined timer period is se: and then it is determined whether writing is completed boot memory 20 is particularly meaningful when use is made of an EEPROM as boot memory 20. This is because, in writing data into an EEPROM, it is normally required to apply a relatively high write voltage for a relatively long period of time, and, thus, it is necessary to make confirmation by checking the fact that writing has been completed properly. Besides, it is not only the problem of EEPROM itself, but the present invention is also characterized by being able to implement the OBP programming with the sonde 3 located at the ground surface as well as at a deep location within the borehole 8. The space inside the borehole 8 is typically under severe environmental conditions, such as high temperatures and high pressures, and to write data into a memory, such as EEPROM, under such severe conditions would significantly deviate from the specification conditions for writing a normal memory such as ROM. In the present invention, since it is expected to carry out a writing operation under such conditions which deviate from the normal specification conditions or writing data into a memory such as EEPROM, it is particularly of significance to provide a loop for insuring the fact that writing has been completed properly in this manner.

Then, at step 72, if the value of counter "i" is an odd number, then source pointer "source" is incremented to be ready for reading the next word data and then it proceeds to step 73. On the other hand, if the value of counter "i" is an even number, then it proceeds to step 73. And, if value of counter "i" is less than 12, i.e., six words W3–W8 for all the data of a single command, in other words, if writing of 12 byte data has not been completed, it proceeds to step 74 to have the destination address "dist" and counter "i" incremented and then it returns to step 63 to thereby extract the next byte from the command stored in rbuf 30a. Upon completion of writing or all of two data bytes of the command stored in rbuf 30a, it proceeds to step 75 from step 73 to thereby terminate the writing process.

Figure 6:
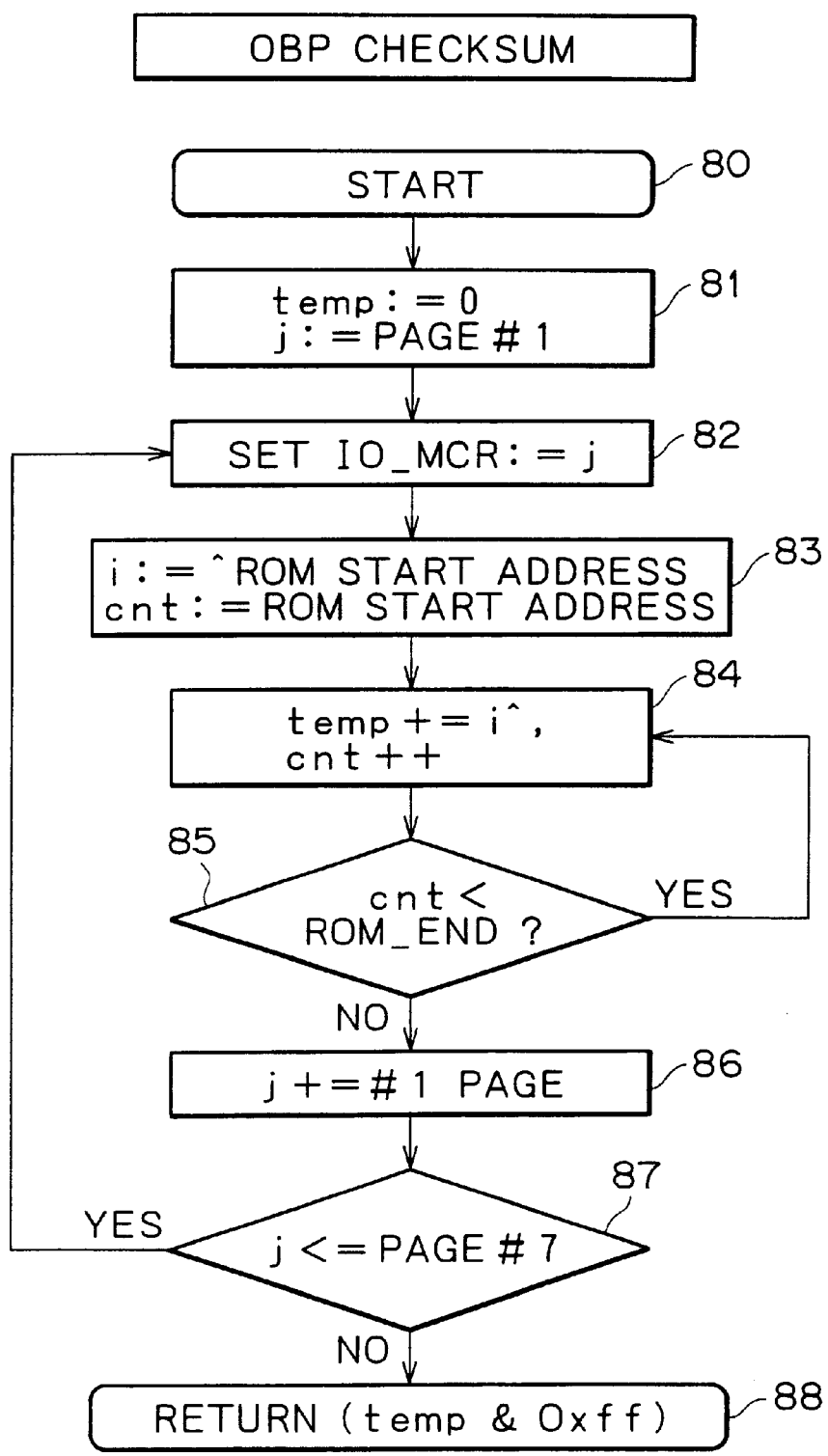
FIG. 6 Flow chart showing a sub-routine for checking the result of writing of the on-board programming which is called by the main routine of FIG. 4.

Now, with reference to FIG. 6, sub-routine obp_checksum will be described below. Upon completion of writing of the last OBP command at step 48 of the main routine illustrated in FIG. 4, as shown at step 80 in FIG. 6, sub-routine obp_checksum for checking whether there is any error or not is called. Step 81 is an initialization step, and parameter "temp" for storing a temporary SUM or the result of addition is set at 0. Then, at step 82, IO_MCR register 22a in charge of management of page number is set at "j", and, at step 83, address coiner "i" is initially set at the start address of EEPROM or boot memory 20. In addition, read counter "cnt" is also initially set at the start address or the EEPROM. At step 83, it is shown as "ROM" for the matter of convenience, but it is to be noted that this, in fact, refers to EEPROM 20. Then, at step 84, the value indicated by address pointer "i" is added to parameter "temp" and then counter "cnt" is incremented. Step 84 is carried out respectively until it comes to the end of the page in question. Then, upon completion of the page at step 85, it proceeds to step 86 to increment page number "j", followed by returning to step 82 to repeat the same process once again. And, upon completion of the processing for all of the pages, it proceeds to step 88 from step 87 to thereby terminate the checksum process. Then, parameter "temp" having the SUM result and the hexadecimal number "0xFF" are ANDed to thereby provide only the lower eight bits of "temp" as the final result.

Effects

As described in detail above, in accordance with the present invention, it is possible to modify the logging program inside a sonde through a telemetry system and it is not necessary to disassemble and assemble the sonde. In addition, since the logging program is not stored in a ROM, but stored in a programmable non-volatile memory, even if the logging program inside the sonde has been modified, no ROM is wasted. Moreover, in accordance with the present invention, the logging program inside the sonde can be modified whether the sonde is located at the ground surface or inside a borehole.

What is claimed is:

1. A borehole logging system, comprising:
   i) a surface processing apparatus;
   ii) a logging cable; and
   iii) a sonde connected to the surface processing apparatus by means of the cable and supported thereby for upwards and downwards movement in the borehole, the sonde comprising:
      a) signal processing means for processing a sampled detection signal according to a predetermined signal processing program;

b) first memory means for storing the predetermined signal processing program; and
c) second memory means storing a writing program for writing the signal processing program to the first memory means in accordance with commands received from the surface processing apparatus.

2. A logging system according to claim 1, wherein the first and second memory means are non-volatile.

3. A logging system according to claim 2, wherein the first memory means includes at least a portion of an EEPROM.

4. A logging system according to claim 3, wherein the second memory means includes another portion of the same EEPROM.

5. A logging system according to claim 3, wherein the second memory means includes a ROM.

6. A logging system according to claim 1, wherein the signal processing means includes a digital signal processor.

7. A logging system according to claim 1, wherein the surface processing apparatus includes a computer and data storing means, the signal processing program being stored in the data storing means and transferable from the data storing means to the first memory means through the logging cable in accordance with the writing program stored in the second memory means.

8. A logging system according to claim 7, wherein the transfer of the signal processing program is carried out with the sonde located in the borehole.

9. A method for operating a borehole logging system comprising a surface processing apparatus, a logging cable, and a sonde connected to the surface processing apparatus by means of the cable and supported thereby for upwards and downwards movement in the borehole, the method comprising:

i) storing a signal processing program in the surface processing apparatus;

ii) transferring the signal processing program to the sonde via the cable;

iii) storing the signal processing program in a first memory means in the sonde by means of a writing program stored in a second memory means in the sonde; and iv) processing a sampled detection signal in signal processing means in the sonde according to the signal processing program.

10. A method as claimed in claim 9, wherein the writing program is operated by means of a command issued to the sonde from the surface processing apparatus.

11. A method as claimed in claim 9, wherein the steps of transferring the signal processing program, and storing the signal processing program in the first memory means are performed while the sonde is in the borehole.

12. A method as claimed in claim 9, wherein the steps of transferring the signal processing program, and storing the signal processing program in the first memory means are performed while the sonde is located at the surface and connected to the surface processing apparatus by means of the cable.

* * * * *